UNITED STATES PATENT OFFICE.

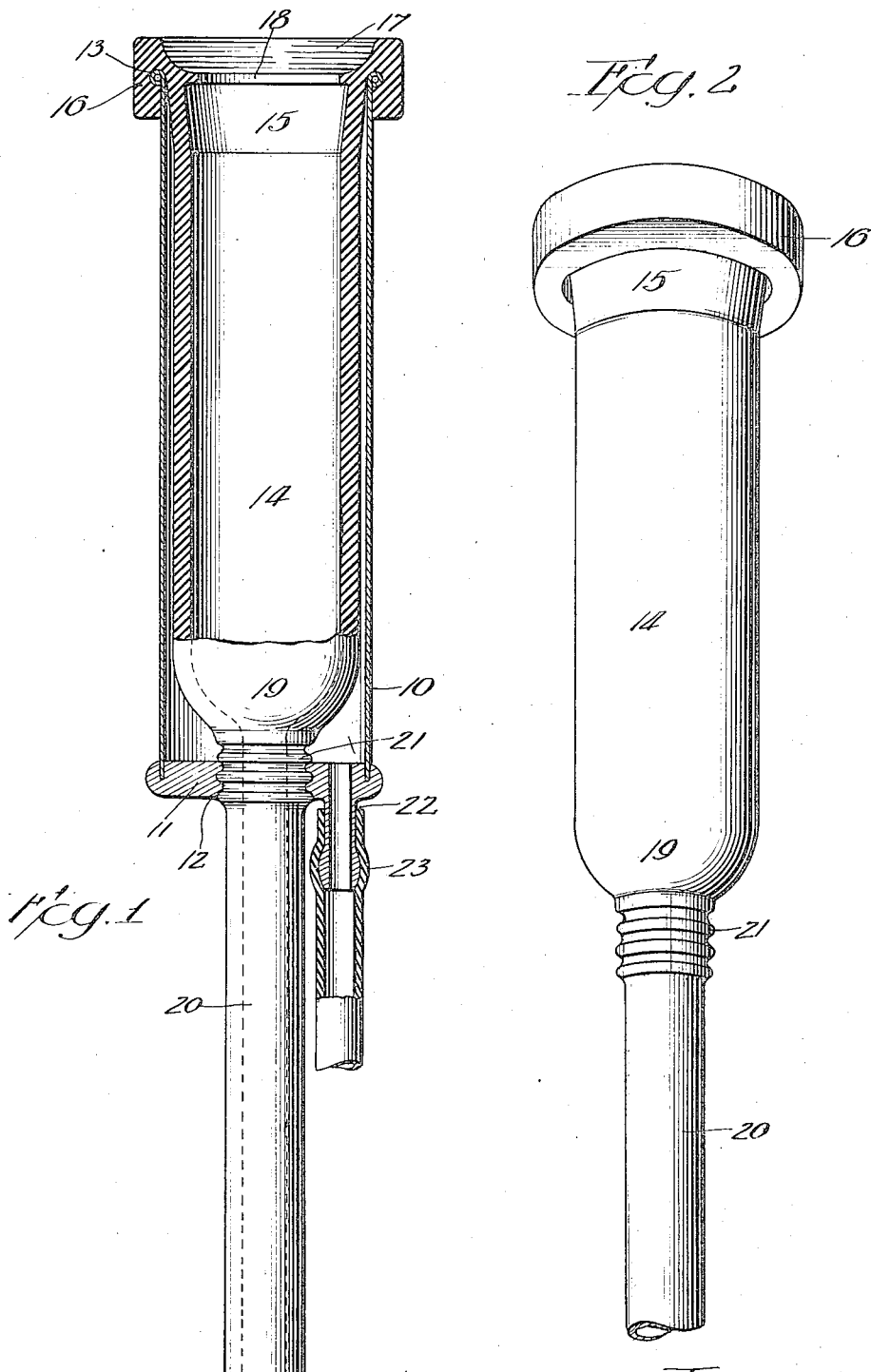

FREDERICK A. GESSLER, OF LA GRANGE, ILLINOIS, ASSIGNOR TO ELECTRIC MILKER CORPORATION, OF CHICAGO, ILLINOIS, A CORPORATION OF DELAWARE.

TEAT CUP FOR MILKING MACHINES.

1,425,584.  Specification of Letters Patent.  Patented Aug. 15, 1922.

Application filed April 2, 1921. Serial No. 457,957.

*To all whom it may concern:*

Be it known that I, FREDERICK A. GESSLER, a citizen of the United States, residing at La Grange, in the county of Cook and State of Illinois, have invented certain new and useful Improvements in Teat Cups for Milking Machines, of which the following is a specification.

This invention pertains to a teat cup for use on milking machines, and has particular reference to a teat cup employing independent milk and air line connections, although certain of the features of invention herein set forth are available for use in teat cups in which a combined milk and air line connection is employed.

The principal object of the invention is to so configure the rubber lining of the teat cup and its attached tubing that the lining may be firmly held in position within the metal housing, and so that a continuous unbroken line of communication will be afforded from the lining into the tubing associated therewith, thereby facilitating the removal and cleaning of the milk conduit as occasion may require.

In the drawings:

Figure 1 is an elevation mainly in section of the lining and its associated housing with a section of the tubing extending from the lining; and Fig. 2 is a perspective view of the lining and milk tubing.

The teat cup as a whole comprises a cylindrical metal shell 10, the lower end of which is inserted into and enclosed by a base plate 11 having in its center a grooved aperture 12, the grooves preferably being formed of individual grooves not connected with one another as in the case of a screw thread. The upper end of the tubing is beaded to form a lip 13 which presents a smooth rounded surface for contact with the rubber lining now to be described. The lining consists of an elongated body portion 14 of a size and shape to afford a firm but easy contact with the teat of the cow, and the upper end of the lining at the point 15 is slightly flared, as indicated, and connects with an undercut annular head portion 16, the rim of which overhangs the flared body portion of the lining, affording an annular space for the reception of the upper beaded end of the metal casing.

The mouth 17 of the head is dished, as indicated, and merges into an annular flange 18, the configuration being such as to afford a firm contact with the udder of the cow at a point contiguous to the teat so that a firm seal will be afforded. The lower end 19 of the lining is of spherical configuration and merges into a milk line tube 20, which latter, at the point of mergence, is provided with a series of beads or ribs 21 adapted to engage with the grooves 12 on the base plate 11. The base plate at a point laterally adjacent to the milk line tube is provided with a nipple 22 to which is fitted an air line tube 23, although the nipple and separate air line tube might be omitted in cases where it is desired to employ a combined milk and air line and impart direct suction to the teat of the cow. It will be noted that the lining fills a greater portion of the space inside the shell, but that it is slightly separated therefrom throughout its length, the connections at the top and bottom being relied upon to maintain the spaced relationship between the lining and the shell.

In use the teat cup is applied to the teat of a cow and vacuum is imparted through the milk tube which is in constant communication with the vacuum in the pail. Alternate vacuum and relief is imparted to the space outside the lining, in a manner well known in the art, to the air line pipe, which alternation of conditions produces an effect comparable to the hand milking of the cow. That is to say, when the space surrounding the lining is momentarily subjected to a subnormal pressure, it will have the effect of equalizing conditions between the inside and outside of the lining, thereby relieving the teat momentarily from compression, and thereafter when atmospheric conditions are again established in the outer space, the lining will again compress the teat in a manner comparable to the action of the hand during the hand milking operation. This method of indirectly applying alternate pressure and release is well understood in the art, but the construction of the lining and its association with the shell in the manner here described possesses special advantages, in that it permits the lining and connected tube to be formed of a single piece, thereby avoiding any breaks or protuberances which would tend to become foul and which would render difficult the operation of cleaning the milk line which is of vital importance in the present art. The natural elasticity of the rubber lining and its undercut head permit these parts to be quickly applied to the shell, and in order to maintain the lining in proper relation to the shell, the former may be adjusted by stretching the same to the desired degree, the rubber beads which engage with the co-acting channels in the base plate affording an interlock which enables the parts to be held and maintained in proper position of adjustment.

Furthermore in case the lining becomes slightly stretched by reason of continued usage, any slack in the fit may be taken up by drawing the tubing to a more advanced position with respect to the interlocking grooves in the base plate.

The invention is one which tends to promote the proper maintenance of the parts in a serviceable and sanitary condition at the same time facilitating the assembling and disassembling of the constituent parts for purposes of cleansing, repair, or renewal.

I claim:

1. A teat cup comprising a rigid outer shell, a flexible lining engaging the outer rim of the shell, a flexible milk tube of lesser diameter than the lining and integrally formed therewith and extending from the inner end thereof through the inner end of the shell, and means exterior of the inner milk passage for adjustably interlocking the inner end of the lining with the shell, substantially as described.

2. A teat cup comprising a rigid outer shell, a flexible lining engaging the outer rim of the shell, a flexible milk tube of lesser diameter than the lining and integrally formed therewith and extending from the inner end thereof through the inner end of the shell, and interlocking means formed in part integrally with the lining and in part with the shell and adapted for adjustably engaging the inner end of the lining with the shell, substantially as described.

3. A teat cup comprising a rigid outer shell, a lining provided with an enlarged head adapted to engage the outer rim of the shell, a milk line tube leading from the lining, and means for adjustably securing the inner end of the lining to the shell, said means consisting of interlocking grooves and ridges formed in the base of the lining and shell respectively, substantially as described.

4. A teat cup comprising a rigid outer shell, a lining provided with an enlarged head adapted to engage the outer rim of the shell, a milk line tube leading from and integrally formed with the lining, and means for adjustably securing the inner end of the lining to the shell, said means consisting of interlocking grooves and ridges formed in the base of the lining and shell respectively, substantially as described.

5. In a teat cup, the combination of a metallic shell provided with a base plate having an aperture therein, said aperture being provided with a series of grooves, a lining provided with an enlarged head undercut to overhang the outer end of the shell and engage therewith, the base portion of the lining being reduced in diameter and merging into a milk line tube, and a series of beads or ridges contiguous to the base of the lining and adapted to adjustably engage with the grooves in the base plate, substantially as described.

6. In a teat cup, the combination of a metallic shell provided with a base plate having an aperture therein, said aperture being provided with a series of grooves, a lining provided with an enlarged head undercut to overhang the outer end of the shell and engage therewith, the base portion of the lining being reduced in diameter and merging into a milk line tube, and a series of beads or ridges contiguous to the base of the lining and adapted to adjustably engage with the grooves in the base plate, the lining with its head and milk line tube being integrally formed of rubber, substantially as described.

FREDERICK A. GESSLER.